Oct. 16, 1945.  C. M. OSTERHELD  2,387,177
WATER HEATER CONTROL SYSTEM
Filed Feb. 4, 1944
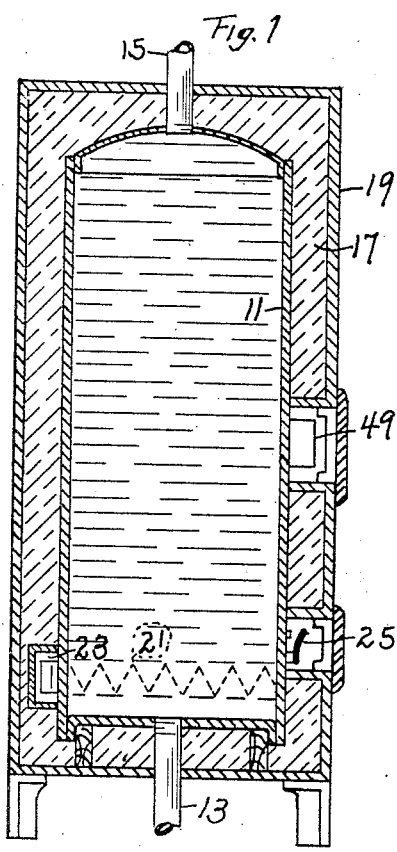
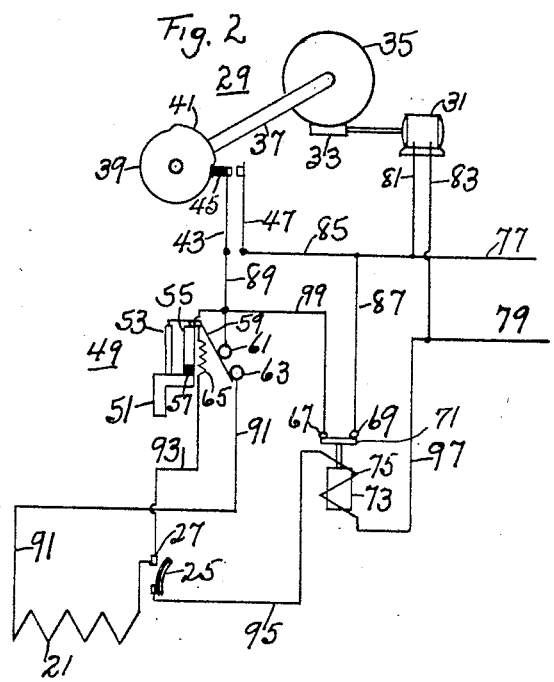
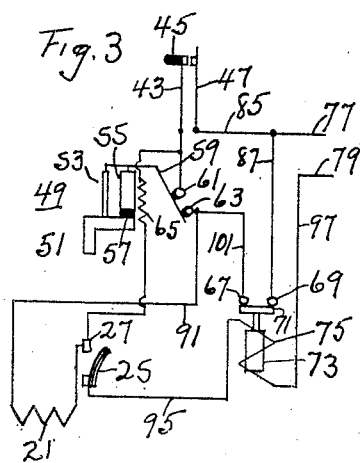
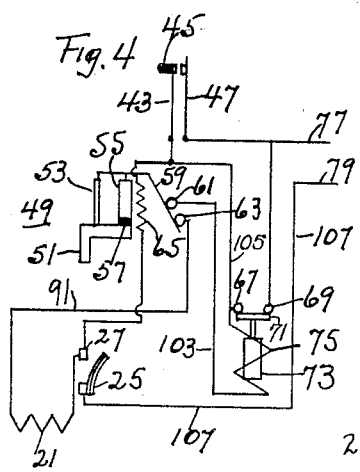
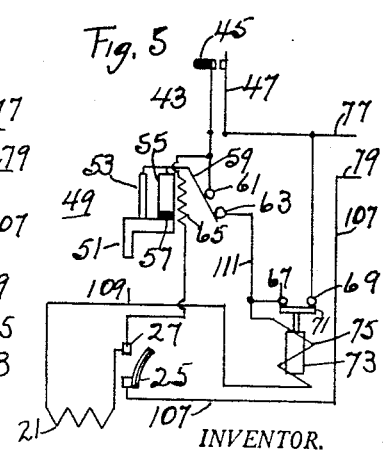
INVENTOR.
CLARK M OSTERHELD
BY
H. M. Biehl
ATTORNEY.

Patented Oct. 16, 1945

2,387,177

UNITED STATES PATENT OFFICE 2,387,177

WATER HEATER CONTROL SYSTEM

Clark M. Osterheld, Stoughton, Wis., assignor to McGraw Electric Company, Elgin, Ill., a corporation of Delaware Application February 4, 1944, Serial No. 521,112

8 Claims. (Cl. 219—39)

My invention relates to electric heating and particularly to control systems for electric heaters of domestic hot water tanks.

An object of my invention is to provide a system for controlling the electric heater of a domestic hot water tank adapted to be energized during an off-peak period to ensure that all of the water in the tank shall be hot before the heater is deenergized.

Another object of my invention is to provide a heater control system adapted to energize an electric heater during off-peak times only and that shall ensure continuation of energization of the heater beyond the end of the off-peak period in case less than all of the water in the tank is hot when the off-peak heater-control switch is opened at the end of an off-peak period.

Other objects of my invention will either be apparent from a description of several modifications of a control system embodying my invention or will be pointed out in the course of such description and will be set forth in the appended claims.

In the drawing,

Figure 1 is a vertical sectional view through a domestic hot water tank having an electric heater thereon controlled by my system.

Fig. 2 is a diagram of connections embodying my invention, and,

Figs. 3, 4, and 5 are modifications of the system shown in Fig. 2.

Referring first of all to Fig. 1 of the drawing I have there shown a domestic hot water tank 11 having a lower cold water inlet pipe 13, an upper hot water outlet pipe 15, heat insulating material 17 around the tank, which heat insulating material is held in proper operative position around the tank as by an outer casing 19.

I provide preferably, but not necessarily, a single electric heater 21 positioned around the outside of the tank 11 at its lower end. The heater shown schematically is of the clamp-on type and may be located within a tunnel member 23. All of the above mentioned details are old, well known in the art, and constitute no part of my present invention.

I provide a lower, first thermally-actuable heater control switch which I have shown generally only as including a bimetal bar 25 which has one end thereof mounted in heat-receiving relation on the tank 11 adjacent the lower end portion thereof. While I have shown a specific form of such switch I do not desire to be limited thereto since any other switch effective for the same purpose may be used. When the tank has therein sufficient cold water to affect the bimetal bar 25, this bar will be in circuit-closing position, that is its free end will be in engagement with a contact member 27, and when the lower end portion of the tank is filled with hot water, the bimetal bar 25 will have flexed away from the fixed contact member 27 to open the heater circuit. I may here point out that by cold water I mean water the temperature of which is on the order of 65° to 70° F., while when I refer to hot water, I mean water the temperature of which is on the order of 150° F. or slightly higher.

Referring now to Fig. 2 of the drawing, I have there shown a continuously operative timer controlled switch unit 29 including an electric motor 31 having a worm 33 on its shaft, which worm is adapted to engage a worm gear 35 to cause rotation of the same. Worm gear 35 is fixedly mounted on one end of a shaft 37, which also has fixedly mounted thereon at its other end a cam disc 39. The greater portion of the outside surface of cam disc 39 has substantially uniform radius but a small portion 41 has a slightly larger radius for a purpose which will appear. It is to be noted that the drawings of the timer are general only, it being understood that the cam disc 39 is adapted to be rotated through 360° during a 24 hour day, in a clockwise direction.

A heater circuit control switch actuable by the timer mechanism includes a resilient contact arm 43 having a lug 45 of electric-insulating material thereon at its outer end, which lug is adapted to move over the peripheral surface of cam disc 39. When the lug 45 engages the portion 41 of the cam disc, it will be moved into engagement with a substantially rigid contact arm 47; whereby it will be moved into closed-circuit position. The peripheral extent of portion 41 is equal to the length of an off-peak period, which may extend from 12 midnight to 6 a. m. I do not desire to be limited to this length of off-peak period nor to the specified time, since the ideas of the engineers of the utility supplying electricity will prevail. Nor do I desire to be limited to the particular embodiment illustrated, since any other time controlled switch effective for the same purpose may be used. I provide a thermal retarder unit 49 which is preferably mounted in heat-receiving relation on the tank 11 at substantially the mid-height thereof. I have indicated this thermal retarder generally only as including a heat-conducting support 51 adapted to be mounted against the outside surface of the tank. A first high-expansion rod 53 is adapted to have its lower end secured in heat-receiving relation on the support 51. A second low expansion bar 55 is adapted to be mounted on a heat-insulating block 57, the two rods being spaced a small distance apart and extending substantially parallel to each other. A switch arm 59 is pivotally connected with and supported by the two expansion rods 53 and 55 and is adapted to engage two contact members 61 and 63 under certain conditions. Briefly, these conditions are that when the temperatures of the two expansion rods are at substantially the same low value, for instance at ordinary room temperature, the switch arm 59 will be in engagement with the contact members 61 and 63. If, however, the high expansion rod 53 is subject to the temperature of hot water, its length will have been increased, and if the temperature of the low expansion rod 55 has not been increased appreciably, the switch arm 59 will be out of engagement with contact members 61 and 63.

I provide a low wattage heating coil 65 for the low expansion rod 55, the amount of energy translated into heat in heating coil 65 being on the order of several watts only. If now heating coil 65 has been energized for a length of time on the order of four to six hours, the maximum operating temperature of rod 55 will have been reached, this maximum temperature being on the order of 300° F. or slightly higher. When rod 55 has reached such temperature, its length will be substantially that of the high expansion bar 53 when the latter is heated to 150° by contact with hot water in the tank. Reference may be had to my copending application, S. N. 511,387, filed November 22, 1943, and assigned to the same assignee as is the present application, for a detailed description of such thermal retarder heater control switch unit.

I provide further an electromagnetic switch unit comprising a pair of fixed contact members 67 and 69 adapted to be engaged by a contact bridging member 71 which is insulatedly connected to an armature core 73 adapted to be energized and moved by a coil 75.

I provide a pair of supply circuit conductors 77 and 79 to which the terminals of the motor winding may be connected by two conductors 81 and 83. Supply circuit conductor 77 is connected by a conductor 85 with rigid contact arm 47 which is also connected by a conductor 87 with the fixed contact 69. The resilient contact arm 43 is connected by a conductor 89 with fixed contact member 61 of the thermal retarder switch unit and with one terminal of the heating coil 65. The second contact terminal 63 of the thermal retarder switch unit is connected by a conductor 91 with one terminal of the electric heater 21, the other terminal of which is connected to fixed contact member 27. Fixed contact member 27 is connected by a conductor 93 with the other terminal of heating coil 65. The fixed end of bimetal bar 25 is connected by a conductor 95 with one terminal of coil 75 of the electromagnetic switch, the other terminal of which is connected by a conductor 97 with supply circuit conductor 79. The other fixed contact member 67 of the electromagnetic switch is connected by a conductor 99 with the resilient contact arm 43 and therefore with contact 61 and one end of heating coil 65.

Let it be assumed that the tank 11 is filled with cold water so that the lower thermally-actuable switch will be in closed position, as will also the thermal retarder switch. If this condition obtains just before the start of an off-peak period, as shown in Fig. 2, when further rotation of cam disc 39 occurs sufficient to cause lug 45 to engage the off-peak cam portion 41, closure of the timer controlled circuit switch will cause immediate energization of the heater 21. In case, however, the tank is filled with cold water before the start of an off-peak period, no energization of the heater 21 can occur until closure of the timer controlled off-peak switch.

Upon closure of the time controlled switch, the electric heater 21 will be energized, as will also the heating coil 65. The temperature of the water in the tank, when starting with a tank full of cold water, will be substantially uniform from top to bottom, and this temperature increases with the length of time of energization of the heater 21. The energized heating coil 65 causes rise of temperature of the low expansion rod 55, which will reach its maximum temperature and expansion in from four to six hours. Since the water in the tank will not be heated to a temperature of 150° F. until the heater 21 has been energized for say six hours, the thermal retarder switch will remain closed during the time required to heat all of the water, and deenergization of heater 21 will be effected by thermal switch 25.

Simultaneously with the energization of the heater 21 by the three heater control switches, the current carrying coil 75 of the electromagnetic switch has drawn up its armature to thereby cause engagement of the contact bridging member 71 with the two fixed contact members 67 and 69. This will, in effect, provide a shunt around the timer controlled switch comprising the two contact arms 43 and 47 so that in case the off-peak period would expire before all of the water in the tank was hot, energization of heater 21 would continue until all of the water in the tank is hot. Such condition can occur, if, for instance, people in the home had necessity for a relatively large amount of hot water during the off-peak period, which, as hereinbefore stated, usually extends from 12 midnight to 6 a. m. It is therefore evident that the electromagnetic switch provdes means for prolonging the energization of the electric heater 21 beyond the off-peak period in case the electric heater was energized during the off-peak period but less than all of the water is hot at the end of an off-peak period.

Let it be assumed that only enough hot water has been withdrawn from the tank during the on-peak hours so that bimetal bar 25 only is subject to cold water and has moved into engagement with contact 27. As soon as the time controlled switch 29 is closed at the start of an off-peak period, heating coil 65 will be energized with resultant temperature rise of rod 55, which temperature will reach its maximum operating value in say four hours. The expanded rod will cause reclosure of the thermal retarder switch, energization of heater 21 through the lower thermal switch, the thermal retarder switch and the time controlled switch, which latter is shunted by the electromagnetic switch, the coil of which carries the heater current. Energization of heater 21 will continue until substantially all of water in the tank is hot, when bimetal bar 25 will be moved out of engagement with contact 27.

If now enough cold water is in the tank to subject not only the lower thermal switch to cold water but also the thermal retarder switch, energization of the heater 21 will start immediately upon closure of the time controlled switch 29 and will continue until all of the water is hot, when bimetal bar 25 will deenergize the heater, as above described.

Referring now to Fig. 3 of the drawing, I have there illustrated a modification of a control system effective for the same purpose, namely that of prolonging the energization of the electric heater for a hot water tank beyond the end of an off-peak period in case the heater was energized during the off-peak period and less than all the water in the tank is hot at the end of the off-peak period. The fixed contact terminal 67 of the electromagnetic switch is connected to the fixed contact terminal 63 of the thermal retarder switch by a conductor 101 extending from contact 63 to contact 67. Fixed contact 69 is connected to conductor 85 by a conductor 87 as was the case in Fig. 2 of the drawing. In effect, therefore, the electromagnetic switch is connected in shunt circuit relation not only to the timer controlled switch but also to the thermal retarder control switch. Otherwise the same comments made hereinbefore with regard to the control system of Fig. 2 apply equally to the system shown in Fig. 3.

Referring now to Fig. 4 of the drawing, I have there shown a further modification of a control system embodying my invention. One terminal of the coil 75 of the electromagnetic switch is connected by a conductor 103 with fixed contact 61 of the thermal retarder switch, while the other terminal of coil 75 is connected by a conductor 105 with fixed contact member 67 of the electromagnetic switch and with resilient contact arm 43. The fixed end of bimetal bar 25 is connected by a conductor 107 with supply circuit conductor 79. It is evident that the electromagnetic switch is connected in shunt circuit relation with only the timer circuit switch in this diagram of circuits.

Referring now to Fig. 5 of the drawing I have there shown a still further modification of system embodying my invention, in which one terminal of electric heater 21 is connected by a conductor 109 with one terminal of coil 75 of the electromagnetic switch, the other terminal of which is connected by a conductor 111 with fixed contact member 67 of the electromagnetic and with contact member 63 of the thermal retarder switch. In the modification shown in Fig. 5 of the drawing, it is evident that the electromagnetic switch is connected in shunt circuit with not only the timer controlled switch but also with the thermal retarder control switch. Substantially the same remarks as regards the operation of the systems shown in Figs. 3, 4, and 5 will apply thereto as were made hereinbefore in connection with the system shown in Fig. 2 thereof.

It is therefore evident that the various systems of control illustrated particularly in Figs. 2, 3, 4, and 5 provide a relatively simple and inexpensive system of control including a thermally-actuable heater control switch mounted on the tank at the lower end portion thereof, a thermal retarder heater control switch mounted on the tank intermediate its ends and a timer controlled switch actuated by a continuously operative timer means that shall ensure that energization of the electric heater for a tank will continue until all of the water in the tank is hot, this continuation extending to beyond an off-peak period in case less than all of the water in the tank is hot at the end of an off-peak period.

While I have illustrated and referred to a specific embodiment of a thermal retarder, I do not desire to be limited thereto, since any other form of thermal retarder effective for the same purpose may be used. The general method of operation of such thermal retarder is that if the thermal retarder is subject to cold water in the tank, its switch will be in closed position, while if it is subject to hot water in the tank and the temperature of the second rod is well below its maximum value on the order of 300° F., its switch will be in open position, while if the thermal retarder is subject to hot water in the tank with the second rod at a temperature of 300° F. or over, the switch will be in closed position.

Various other modifications may be made in the systems embodying my invention without departing from the spirit and scope thereof and all such modifications coming clearly within the appended claims are to be considered covered thereby.

I claim as my invention:

1. In a water heater control system for a hot water tank having an electric heater, comprising three heater control switches connected in series electric circuit relatively to each other and to the electric heater, the first switch being thermally-actuable by tank water at the lower end portion of the tank and being in closed position when subject to cold water, the second switch being a thermal retarder switch unit comprising a pair of dissimilarly thermally-responsive elements, subject to tank water temperature intermediate the ends of the tank and effective to selectively move the switch to closed position immediately and with a time delay period in accordance with its subjection to cold or to hot water and said third switch being time controlled and being moved into closed position during a predetermined period of a twenty-four hour day and heater-current controlled means for ensuring continuation of the energization of said electric heater beyond the opening of said time controlled switch in case said first switch is subject to cold water when said time controlled switch is opened.

2. In a water heater control system for a hot water tank having a cold water inlet at the lower end thereof, a hot water outlet at the upper end thereof and an electric heater at its lower end portion adapted to be connected to an electric supply circuit having off-peak periods of reduced demand during a twenty-four hour day, said system comprising a plurality of heater control switches connected in series circuit with each other and with the heater, a first switch being thermally actuable by tank water at the lower end portion of the tank and being in closed position when subject to cold water, a second switch being time controlled and being in closed position during off-peak periods and a third switch being a thermal retarder switch unit comprising a pair of dissimilarly thermally-responsive elements, subject to tank water temperature intermediate the ends of the tank and selectively effective to move its switch into closed position immediately and with a time delay period after closure of said time controlled switch in accordance with its subjection to cold or to hot water and heater-current controlled switching means to ensure continuation of energization of said electric heater until substantially all of the water in the tank is hot in case less than all of the water in the tank is hot when said time controlled switch is opened at the end of an off-peak period.

3. In a water heater control system for a hot water tank having a cold water inlet pipe at the lower end thereof, a hot water outlet pipe at the upper end thereof and an electric heater at its lower end portion adapted to be connected to an electric supply circuit having off-peak periods of reduced demand during a twenty-four hour day, said system comprising a plurality of heater control switches connected in series circuit with each other and with the heater, a first switch being thermally actuable by tank water at the lower end portion of the tank and being in closed position when subject to cold water, a second switch being time controlled and being in closed position during off-peak periods and a third switch being a thermal retarder switch unit comprising a pair of dissimilarly thermally-responsive elements, subject to tank water temperature intermediate the ends of the tank and selectively effective to move its switch into closed position immediately and with a time delay period after closure of said time controlled switch in accordance with its subjection to cold or to hot water and an electromagnetic switch, having its contacts connected in shunt circuit relation relatively to said second and third switch and having a heater-current carrying coil, being in closed position when said electric heater is energized and adapted to continue energization of the heater through itself and said first switch after opening of said second switch in case said first switch is then subject to cold water until said first switch is opened by being subject to hot water.

4. In a water heater control system for a hot water tank having a cold water inlet pipe at the lower end thereof, a hot water outlet pipe at the upper end thereof and an electric heater at its lower end portion adapted to be connected to an electric supply circuit having off-peak periods of reduced demand during a twenty-four hour day, said system comprising a plurality of heater control switches connected in series circuit with each other and with the heater, a first switch being thermally actuable by tank water at the lower end portion of the tank and being in closed position when subject to cold water, a second switch being time controlled and being in closed position during off-peak periods, and a third switch being a thermal retarder switch unit comprising a pair of dissimilarly thermally-responsive elements, subject to tank water temperature intermediate the ends of the tank and selectively effective to move its switch into closed position immediately and with a time delay period after closure of said second switch in accordance with its subjection to cold or to hot water and an electromagnetic switch having contacts and a coil, its contacts being connected in shunt circuit relation relatively to said second and third switch, said coil being connected in series circuit with said plurality of heater control switches and adapted to hold the electromagnetic switch closed when said electric heater is energized to continue energization of said heater beyond the time of opening of said second switch in case less than substantially all of the water in the tank is then hot.

5. A system as set forth in claim 4, in which said first switch effects deenergization of said heater when it is subject to hot water.

6. In a water heater control system for a hot water tank having a cold water inlet pipe at the lower end thereof, a hot water outlet pipe at the upper end thereof and an electric heater at its lower end portion adapted to be connected to an electric supply circuit having off-peak periods of reduced demand during a twenty-four hour day, said system comprising a plurality of heater control switches connected in series circuit with each other and with the heater, a first switch being thermally actuable by tank water at the lower end portion of the tank and being in closed position when subject to cold water, a second switch being time controlled and being in closed position during off-peak periods and a third switch being a thermal retarder switch comprising a pair of dissimilarly thermally-responsive elements, subject to tank water temperature intermediate the ends of the tank and selectively effective to move its switch into closed position immediately and with a time delay period after closure of said second switch in accordance with its subjection to cold or to hot water and an electromagnetic switch having contacts and a coil, its contacts being connected in shunt circuit relation relatively to said second switch, said coil being connected in series circuit with said plurality of heater control switches and adapted to hold the electromagnetic switch closed when said electric heater is energized to continue energization of said heater beyond the time of opening of said second switch in case less than substantially all of the water in the tank is then hot.

7. In a water heater control system for a hot water tank having a cold water inlet pipe at the lower end thereof, a hot water outlet pipe at the upper end thereof and an electric heater at its lower end portion adapted to be connected to an electric supply circuit having off-peak periods of reduced demand during a twenty-four hour day, said system comprising a plurality of heater control switches connected in series circuit with each other and with the heater, a first switch being thermally actuable by tank water at the lower end portion of the tank and being in closed position when subject to cold water, a second switch being time controlled and being in closed position during off-peak periods and a third switch being a thermal retarder switch comprising a pair of dissimilarly thermally-responsive elements, subject to tank water temperature intermediate the ends of the tank and selectively effective to move its switch into closed position immediately and with a time delay period after closure of the time controlled switch in accordance with its subjection to cold or to hot water and an electromagnetic switch having its contacts connected in shunt circuit with said second switch and having a coil adapted to be traversed by the heater current to be held thereby in closed position, said first and third switch and said electromagnetic switch being adapted to continue energization of said electric heater after opening of said second switch in case said first switch is then subject to cold water.

8. A system as set forth in claim 7 in which said first switch is effective to deenergize said heater when subject to hot water.

CLARK M. OSTERHELD.